United States Patent
Fandrianto et al.

(10) Patent No.: US 7,792,062 B1
(45) Date of Patent: *Sep. 7, 2010

(54) SYSTEM AND METHOD FOR SUPPORTING CONFERENCING CAPABILITIES OVER PACKET-SWITCHED NETWORKS

(75) Inventors: Jan Fandrianto, Los Gatos, CA (US); Sam K. Sin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 678 days.

This patent is subject to a terminal disclaimer.

(21) Appl. No.: 11/365,108

(22) Filed: Feb. 28, 2006

Related U.S. Application Data

(63) Continuation of application No. 09/694,619, filed on Oct. 21, 2000, now Pat. No. 7,006,455.

(51) Int. Cl.
*H04L 12/16* (2006.01)
*H04L 12/66* (2006.01)
*H04M 3/42* (2006.01)

(52) U.S. Cl. .................. 370/260; 370/352; 379/202.01; 379/212.01

(58) Field of Classification Search ......... 370/259–260, 370/352–356, 401; 379/212.01, 211.02, 379/202.01, 207.01
See application file for complete search history.

(56) References Cited

U.S. PATENT DOCUMENTS

| | | | | |
|---|---|---|---|---|
| 5,440,624 | A | 8/1995 | Schoof, II | 379/202.01 |
| 5,617,471 | A | 4/1997 | Rogers et al. | 379/212.01 |
| 5,701,340 | A | 12/1997 | Zwick | 379/204.01 |
| 5,841,976 | A | 11/1998 | Tai et al. | 709/204 |
| 5,907,598 | A | 5/1999 | Mandalia et al. | 379/100.01 |
| 5,916,302 | A | 6/1999 | Dunn et al. | 709/204 |
| 5,995,607 | A | 11/1999 | Beyda et al. | 379/202.01 |
| 6,483,912 | B1 | 11/2002 | Kalmanek et al. | 379/219 |
| 6,577,622 | B1 | 6/2003 | Schuster et al. | 370/352 |
| 6,674,746 | B1 | 1/2004 | Lamarque, III | 370/352 |

*Primary Examiner*—Nittaya Juntima
(74) *Attorney, Agent, or Firm*—Baker Botts L.L.P.

(57) ABSTRACT

An IP telephone which supports a voice conference call with a plurality of other IP telephones over a packet-switched network is disclosed. The IP telephone exchanges audio and signaling messages with the other IP devices during the conference call, and thereby allows three or more conference call participants to talk together over the packet-switched network. The IP telephone includes a memory, which stores a conferencing module and a channel establishment module, and a mixing module for mixing input signals received at the IP telephone to produce a combined signal output. When played back, the combined signal output to allows the user to hear what was said by the other conference call participants.

28 Claims, 6 Drawing Sheets

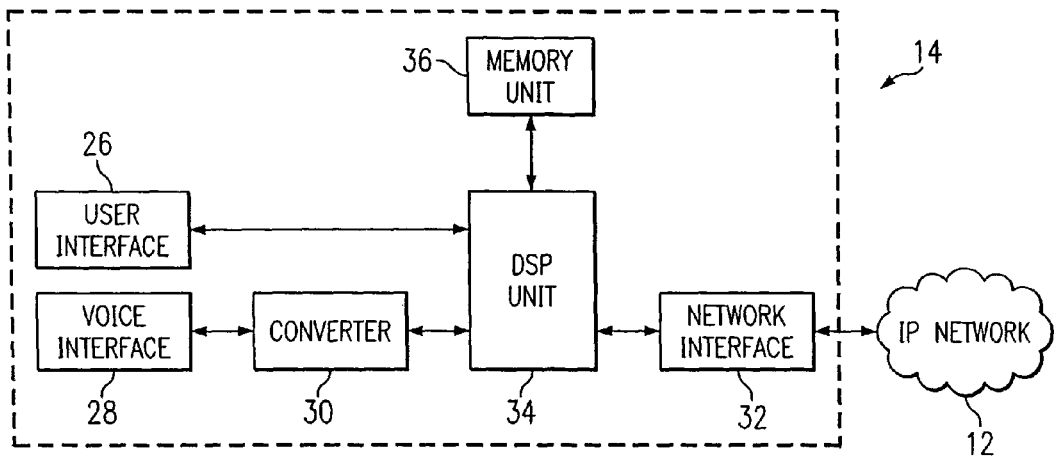
FIG. 3
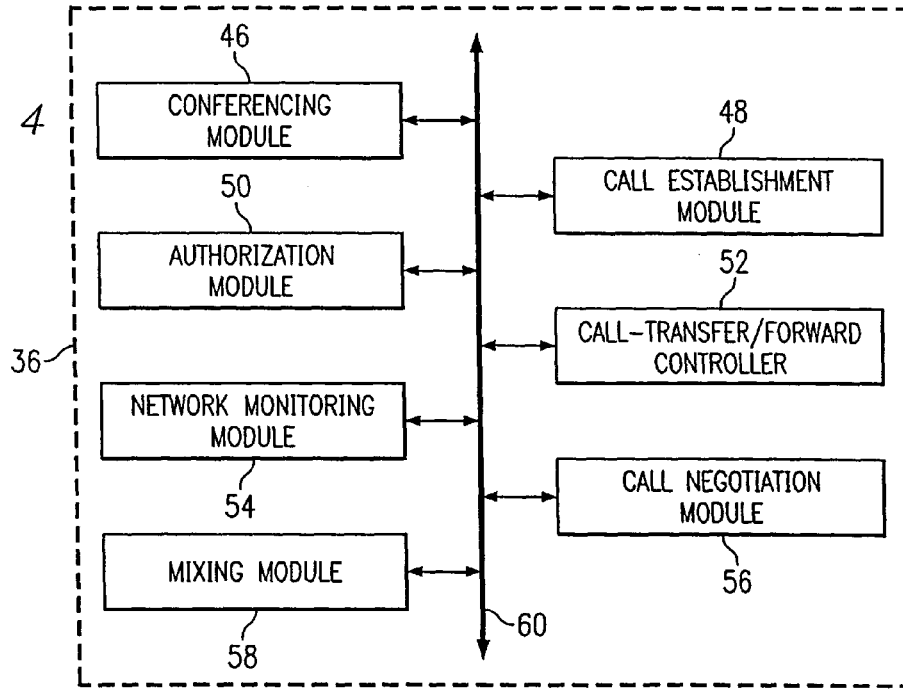
FIG. 4
FIG. 5
| CALL | AVAILABLE TO CONFERENCE DEVICE? | IDENTIFICATION CODE OF DEVICE SUPPORTED | CALL-REFERENCE? | AUTHENTICATED CONFEREE? |
|---|---|---|---|---|
| 1 | N | 0184487753 | NONE | Y |
| 2 | N | 0001589643 | 0184487753 | Y |

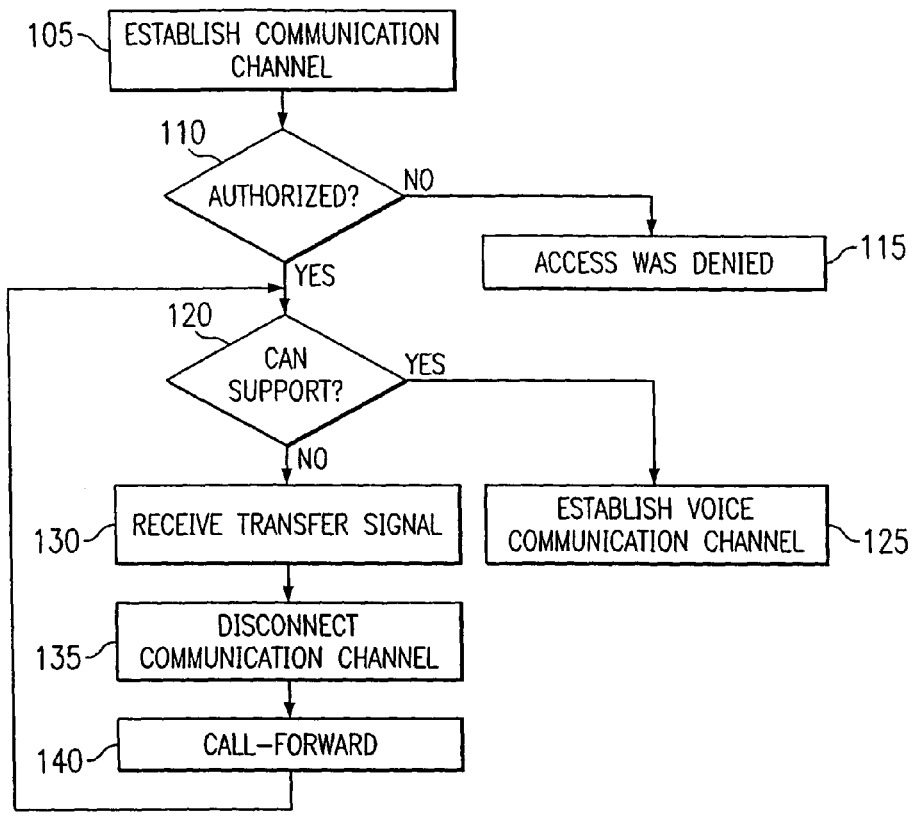
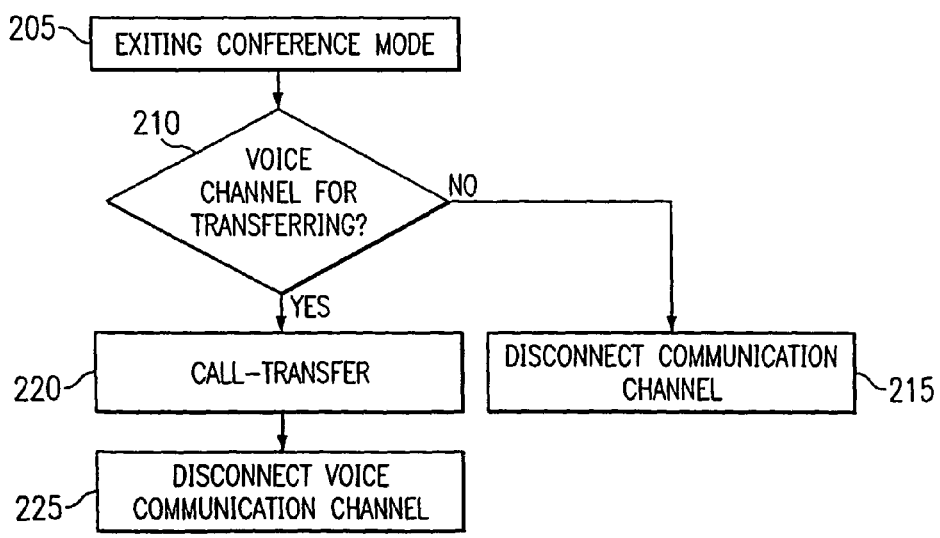

SYSTEM AND METHOD FOR SUPPORTING CONFERENCING CAPABILITIES OVER PACKET-SWITCHED NETWORKS

RELATED APPLICATIONS

This application is a continuation of U.S. application Ser. No. 09/694,619 filed Oct. 21, 2000, now U.S. Pat. No. 7,006,455, issued Feb. 28, 2006, and entitled "System and Method for Supporting Conferencing Capabilities Over Packet-Switched Networks".

This application claims priority to U.S. Provisional Application Ser. No. 60/161,168 filed on Oct. 22, 1999 and entitled "System and Method For Providing Voice Communication Over Data Networks," the entire contents of which are incorporated herein by reference.

FIELD OF THE INVENTION

The invention relates to a system and method for providing conferencing capabilities over packet-switched networks.

BACKGROUND OF THE INVENTION

Networks carry three types of information: voice, video, and data. Historically, these different forms of information have been transported over different networks. Specifically, the public switched telephone network (PSTN) delivered voice information; private corporate networks delivered data information; and broadcast networks delivered video information. Each service was provided by a specific form of infrastructure—the PSTN used copper wires to reach subscribers, broadcast television used the airwaves, cable television used coaxial cable, and so forth.

With advances in technology, the different forms of information can now be carried by any delivery platform. For example, telephony services (i.e., voice and facsimile) can be transported over packet-switched networks, such as the Internet.

"Internet protocol telephony" (IP telephony) refers to the transfer of voice information using the Internet protocol (IP) of the TCP/IP or UDP/IP protocol suite. IP telephony uses the IP network to simulate a telephone connection between two IP network users and bypasses the local exchange carriers' and inter-exchange carrier's telephone networks. IP telephony works by converting voices into data that can be compressed and split into packets. These data packets are sent over the IP network like any other packets and reassembled as audio output at the receiving end. The ubiquitous nature of the IP network allows a user to complete such IP telephone connections to many countries around the world. Accordingly, by using the IP network to provide telephony services, the user can avoid paying per-minute toll charges assessed by the user's local exchange carrier and/or inter-exchange carrier. Rather, the user is subject to only his or her local IP network connection fees, which are typically low, flat-rate monthly fees. The result may be considerable savings when compared to international telephone rates.

When conducting an IP telephone call, most existing dial-up systems require both parties to be, connected to the IP network through a multimedia personal computer. Typical multimedia personal computer systems used for IP telephony include a personal computer, a monitor, an analog-voice-to-digital-signal and digital-signal-to-analog-voice converter (converter), IP telephone software, a full-duplex sound card, a microphone, speakers, and a 28 Kbps or higher rate modulation/demodulation (modem) device. As such, the multimedia personal computer system includes several components or devices and is not easily portable, which may be undesirable for traveling business people. Further, such a personal computer system may be expensive to set up and maintain.

Additionally, many call features used and relied upon by subscribers placing telephone calls over the PSTN are not available with conventional IP telephony applications. Specifically, the ability to conduct voice conference calls (i.e., connecting two or more participants so that they can interactively communicate with one another using communication devices) over the IP network while using conventional telephone handsets or wireless handsets is not readily available. In today's business environment, where it is essential to be able to discuss time-critical information quickly with many people dispersed throughout the world, the ability to conduct conference calls over the IP network with easy-to-use telephonic devices would provide an economical and efficient means for achieving this goal.

Accordingly, it would be desirable to provide a system and method for providing conferencing capabilities that addresses the drawbacks of known systems.

SUMMARY OF THE INVENTION

The present invention relates to a system and method for providing conferencing capabilities over packet-switched networks. The system supports a conference call with a plurality of other stations over a packet-switched network in response to a conference request signal received from each of the plurality of other stations.

In accordance with one aspect of the present invention, the system includes a storage medium and a mixing module for mixing input signals received at the system to produce a combined signal output. The storage medium contains a plurality of programming modules which include a conferencing module and a channel establishment module. The conferencing module receives a conference request signal from a second station and determines whether to establish a communication channel between the system and the second station. Based on the determination of the conferencing module, the channel establishment module can establish the communication channel which supports voice communication over a packet-switched network.

In accordance with another aspect of the present invention, a method for establishing a conference call at a first station with a plurality of other stations over a packet-switched network includes the steps of receiving a first conference request signal at the first station, establishing a first communication channel between the first station and a-second station, receiving a second conference request signal at the first station, establishing a second communication channel between the first station and a third station, and mixing the input signals from the first and second communication channels at the first station and playing a combined signal output at that first station.

A further aspect of the invention relates to a method for maintaining a conference call when a first station disconnects from the conference call, whereby the method includes the steps of determining whether a communication channel between the first station and a second station is supported at the first station, and if so, then transferring the communication channel to a third station, else, disconnecting the first station from the conference call.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 3 is a block diagram of the hardware architecture of the IP telephone;

FIG. 4 is a block diagram of the memory unit of the IP telephone of FIG. 3;

FIG. 5 illustrates stored data in the memory unit;

FIG. 10 is a flowchart showing a first embodiment of a method of establishing a conference call, in accordance with FIGS. 7a-e; and FIG. 11 is a flowchart showing a first embodiment of the method of maintaining a conference call when a conference call participant exits, in accordance with FIGS. 9a-b.

DETAILED DESCRIPTION OF THE PREFERRED EMBODIMENTS

Figure 1:
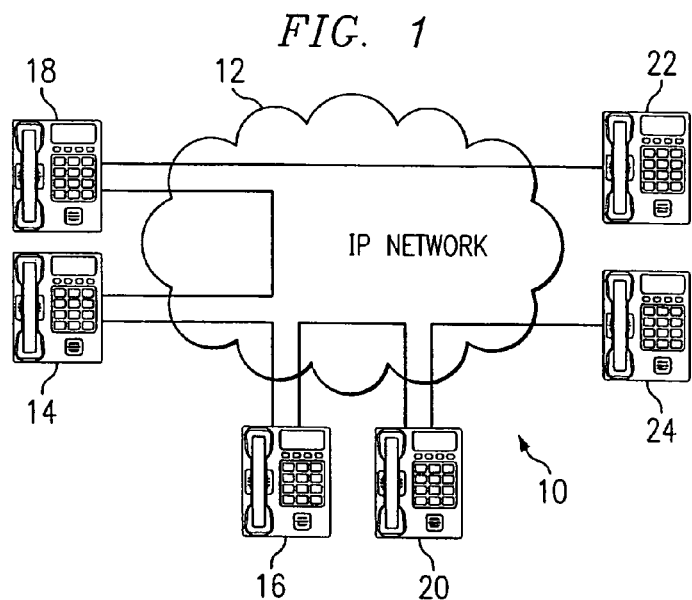
FIG. 1 illustrates an IP telephone call system according to the present invention.

FIG. 1 illustrates one configuration of an IP telephone call system 10. The IP telephone call system 10 transports voice over a packet-switched network 12, such as the IP network, using data packets whereby an IP network subscriber (hereinafter "subscriber" and not shown) having the necessary hardware .and software may conduct real-time voice conversations over the IP network 12. The IP devices or IP telephones 14, 16, 18, 20, 22, 24 forming the IP telephone call system 10 may include a conventional or wireless telephone and an adaptor having IP telephony enabling hardware and software, e.g., the Analog Telephone Adaptor (ATA) product series available from Cisco Systems, Inc. of San Jose, Calif. An alternative embodiment of the IP device has the telephone and adaptor integrated, e.g., the IP Phone 7910/7960 also available from Cisco Systems, Inc., and the IP device may provide video and other services.

As shown in FIG. 1, the IP telephone call system 10 includes at least two IP telephones 14, 16, 18, 20, 22, 24 connected via the IP network 12 to support a conference call, described in greater detail below. The IP telephones 14, 16, 18, 20, 22, 24 exchange audio and signaling messages during the conference call. The signaling can be performed using standard protocols, such as Session Initiation Protocol (SIP) or H.323.

Although any IP telephone 14, 16, 18, 20, 22, 24 can initiate or participate in a conference call over the IP network 12, for illustrative purposes only, it is assumed that the subscriber using the IP telephone 14 will be the conference sponsor, and the subscribers using the IP telephones 16, 18, 20, 22, 24 will be the conferees. Further, each IP telephone 14, 16, 18, 20, 22, 24 can support at least two interactive voice channels. Moreover, the IP telephones 14, 16, 18, 20, 22, 24 can use dial-up modems, cable modems, Ethernet connections, or the like to connect to the IP network 12.

Prior to discussing the present invention in further detail, the following terms are defined:

"Conference call" (or session) means a communication channel where two or more end users are connected so that each user can speak and the others can hear what is said by the speaker.

"Conference sponsor" or sponsor) means a participant initiating or initially supporting a conference call.

"Calling party" means a subscriber requesting to join a conference call.

"Conferee" means a participant in a conference call.

"Communication channel" means a communication path for transferring data and/or audio signals between at least two conferees.

"Voice channel" means bandwidth assigned within the communication channel for transferring audio signals.

"Signaling channel" means bandwidth assigned within the communication channel for transferring data signals.

"Conference mode" means an operational status of being able to support a conference call over a packet-switched network.

"Call-forward" means a process of transferring, or redirecting, a communication channel without having previously established a voice channel. The IP telephone performing the call-forward process exits from the conference call and is then free to receive other incoming calls.

"Call-transfer" means a process of transferring, or redirecting, a communication channel having previously established a voice channel.

"Call-reference" (or referral) means information contained in a data packet header indicating from which IP telephone the data packet was received.

"Mixing" means a summation of two or more source audio signals to produce a combined audio signal output.

Figure 2:
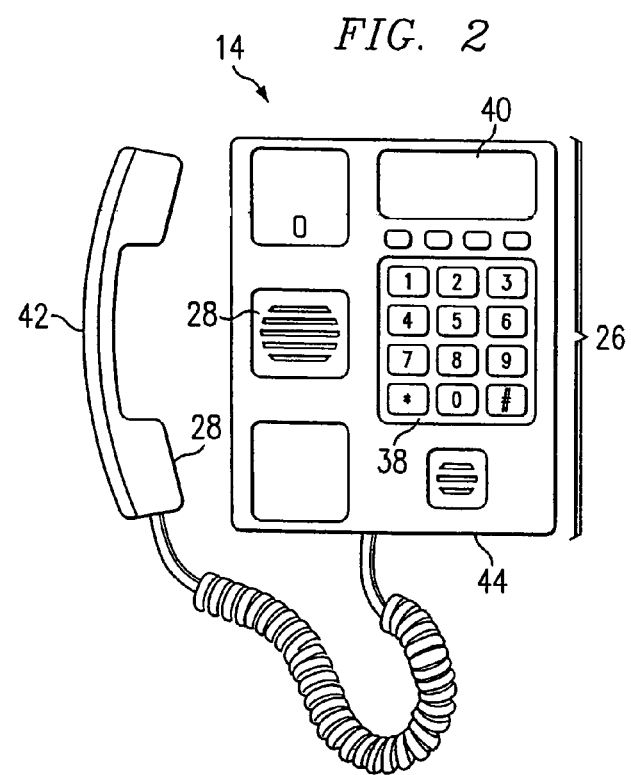
FIG. 2 is a perspective view of one embodiment of an IP telephone.

FIG. 2 shows one embodiment of the IP telephone 14, and FIG. 3 depicts the basic components of the IP device 14. As illustrated in FIGS. 2 and 3, the IP telephone 14 includes a user interface 26, a voice interface 28, a converter 30, a network interface 32, a digital signal processor unit 34 and associated logic, and a memory unit 36. The IP telephone 14 can perform various voice over FP network functions, such as voice compression, data packetization, and network interfacing.

The user interface 26 allows a user to interact with the IP device 14. The user interface 26 includes, among other features, a keypad 38 for dialing numbers or activating certain call functions and an audible indicator for indicating operating characteristics and/or instructions, such as new telephone messages, the call status, or selectable options from a telephonic voice menu, including available call features. Although the IP device 14 is shown as having a keypad 38 for inputting commands or responding to questions, it will be understood that the IP telephone 14 may also use voice, textual, or graphical activation. The user interface 26 may also include a visual display 40 for displaying such operating characteristics.

The voice interface 28, in accordance with conventional practice, is a speaker and microphone located on the telephone handset 42 and/or base 44. Audio signals from the microphone 28 are transmitted to the converter 30 (shown in FIG. 3) that provides the conversion of analog voice into digital signals. Specifically, the analog voice is digitized, by means commonly known in the field, and the digital data are transmitted to a digital signal processor unit 34 (DSP unit shown in FIG. 3) that provides call processing and voice processing.

The network interface 32 allows transmission and reception of voice packets to and from the IP device 14. For example, the IP device 14 has telephone, LAN, and/or Ethernet connectivity.

The DSP unit 34 and associated logic are supported by voice processing software and a memory unit 36, described in detail below. The DSP unit 34 includes a digital signal processor and other control processing units. The DSP unit 34 performs call signaling and control, voice compression and decompression, and packetization and depacketization functions.

The memory unit 36 includes programmable and dynamic memory, such as electrically erasable programmable read-only memory (EEPROM) and dynamic random access memory (DRAM) devices. The memory unit 36 stores the call-forward and call-transfer algorithms, described in greater detail below, which the DSP unit 34 follows, as well as the identification code of each IP telephone supported by the IP telephone 14 (i.e., having a voice communication channel between the IP telephones). The identification code uniquely identifies a particular IP telephone or conferee. In one embodiment, the memory unit 36 also includes a list of authorized conferees or a pre-determined conference password that a calling party must enter, when prompted, to join the present conference call.

As illustrated in FIG. 4, the memory unit 36 includes a conferencing module 46, call establishment module 48, authorization module 50, call-transfer/forward controller 52, network monitoring module 54, call negotiation module 56, and mixing module 58. The memory unit 36 communicates with the various elements via a system bus 60. Moreover, the memory unit 36 operates under the control of an operating system that allows the DSP unit 34 to perform multiple tasks, simultaneously, utilizing the modules and controller contained in memory unit 36.

The conferencing module 46 enables the conferee to set the IP telephone 14 into conference mode, which enables the IP telephone 14 to establish voice channels with other authorized conferees via the IP network 12. The conferencing module 46 also determines whether the IP telephone 14 can support a voice channel with the IP telephone of a calling party. For example, if the IP telephone 14 can support a voice channel with the calling party's IP telephone 16, the call establishment module 48 establishes the voice channel between the to devices. Otherwise, the conferencing module 46 sends a transfer command to the call-transfer/forward controller 52 of the calling party's IP telephone 16 via a signaling channel. The transfer command includes a call-reference and a conference request command that designates another IP telephone connected to the conference call. The conferencing module 46 designates a particular IP telephone based on information provided by the network monitoring module 54, described in greater detail below.

Before establishing the voice channel, the call establishment module 48 indicates, or announces, the joining of the new conferee to the connected IP telephones. For example, the IP telephone 14 may audibly identify the new conferee, based on the identification code, or emit a sound, such as a distinctive double-beep, and/or cause a visual indication on the visual display 40. Such visual indication may include, but is not limited to, displaying the new conferee's name and/or telephone number, made available by mapping the identification code to the appropriate conferee information stored at the memory unit 36. For example, after establishing the voice channel, the identification code of the supported IP telephone can be stored in the memory unit 36, in tabular form, as illustrated in FIG. 5, as well as other information. Here, as it related to FIG. 1, the IP telephone 16 supports voice channels with the IP telephone 14, having an identification code of 0184487753, and IP telephone 20, which has an identification code of 0001589643.

The authorization module 50 performs the function of determining whether a calling party is an authorized participant to the conference call, and thereby provides one level of security. In one embodiment, the conference sponsor can pre-store a conference password in the memory unit 36. Then, in response to receiving a conference request signal, the authorization module 50 prompts the calling party to input the predetermined conference password. After the authorization module 50 validates the conference password inputted by the calling party, the calling party is joined to the conference call. In an alternative embodiment, the conference sponsor pre-stores the identification codes of each authorized conferee in the memory unit 36. In response to receiving a conference request signal, the authorization module 50 of the IP telephone 14 causes a search to be performed on the memory unit 36 for the identification code of the calling party's IP telephone. After locating the identification code in the memory unit 36, the authorization module 50 sends an authorization signal to the conferencing module 46.

The call-transfer/forward controller 52 performs the call-transfer and call-forward processes with little interruption to the conferees. Specifically, upon receiving a transfer command from the conferencing module 46, the call-transfer/forward controller 52 causes the IP telephone 14 to terminate the communication channel and send a conference request signal to the IP telephone designated in the conference request command. Further, the conference request signal contains a call-reference, identifying the IP telephone causing the call-transfer or call forward process to occur.

The call-reference serves at least two functions. First, the call-reference indicates that the call-transferred or call-forwarded IP telephone was participating in the conference call. Thus, if the designated IP telephone can support the call-transferred or call-forwarded IP telephone, it can immediately rejoin the conference call without having to be re-authorized. Second, since the call-reference identifies the IP telephone causing the call-transfer or call-forward process, if, for example, the designated IP telephone 16 cannot support the call-transferred or call-forwarded IP telephone 20, then based on the call-reference, the designated IP telephone 16 will not call-transfer or call-forward back to the IP telephone 14 originally causing the call-transfer or call forward process.

The network monitoring module 54 continuously monitors the network conditions, such as latency, jitter, noise, and packet loss. Such network conditions affect the quality of voice heard at the IP telephone 14. Data packets that travel across multiple communication channels will be affected by network conditions during each communication link. To enhance the voice quality heard by the conferee, the conferencing module 46 will receive information concerning the network conditions from the network monitoring module 54 before sending the transfer command to the call-transfer/forward controller 52 of the calling party's IP telephone. Specifically, based on the network conditions, the conferencing module 46 will designate an IP telephone having acceptable, or superior, quality of service to transfer the voice channel. In an alternative embodiment, the conferencing module 46 determines which W telephone to transfer the voice channel based on a call-transfer or call-forward algorithm stored in the memory unit 36. For example, according to one call-transfer/forward algorithm, as it relates to FIG. 1, the conferencing module 46 of IP telephone 14 alternates the call-forwarding of calling parties between the connected IP telephones 16, 18.

The call negotiation module 56 determines the audio compression/decompression (codec) technique, e.g., G.711, G.723.1, G.729.A, used to encode the digital audio signals received at the IP telephone 14. Based on the determination made by the call negotiation module 56, the IP telephone 14 will automatically adjust to the audio codec technique used by the IP telephone transmitting the audio signals.

In response to receiving two or more uncompressed audio signals at the IP telephone, the mixing module 58 mixes, or adds, the audio inputs to produce a combined audio signal output. For example, the combined audio signal output played at the IP telephone 14 allows the conference sponsor to hear what was said by the other conferees. The mixing module 58 can automatically modify the output level (amplitude) of the audio signal output to ensure such output signal does not exceed the finite dynamic range of the system. Further, the mixing module 58 can support full-duplex communication, such that data is transmitted in two directions simultaneously, or half-duplex communication.

Figure 6:
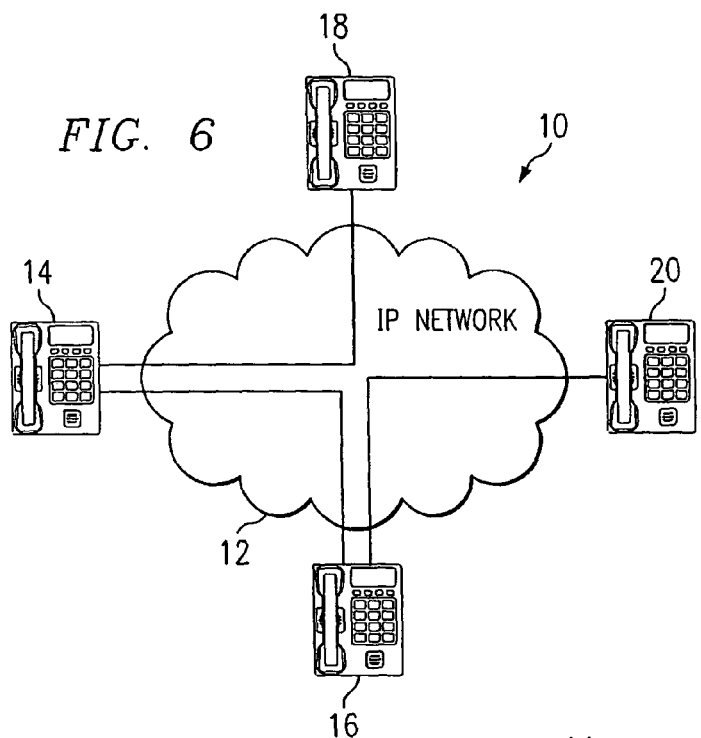
FIG. 6 illustrates one embodiment of the IP telephone call system.

For example, as illustrated in FIG. 6, four conferees at IP telephones 14, 16, 18, 20 are engaged in a conference call over the IP network 12. The IP telephone 14 will receive compressed audio signals from IP telephones 16 (SIGNAL16-4) and 18 (SIGNAL18-14), whereby the SIGNAL16-14 includes the compressed audio signals from IP telephone 20 (SIGNAL20-16). The DSP unit 34 decompresses the received audio signals, and the mixing module 58 at IP telephone 14 mixes the decompressed signals (SIGNAL16/18-14). The mixed, audio signals are played-back at IP telephone 14, thereby enabling the conference sponsor to hear what the other conferees said.

When the conference sponsor speaks, the mixing module at IP telephone 14 mixes the decompressed audio signals from the IP telephone 14 (SIGNAL14-16) and 18 (SIGNAL18-16), and the combined audio signal output is compressed and sent to IP telephone 16. Similarly, the mixing module at IP telephone 14 mixes the decompressed audio signals from IP telephone 14 15 (SIGNAL14-18) and 16 (SIGNAL14-18), and the combined audio signal output is compressed and sent to IP telephone 18. Accordingly, the mixing module 14 at each IP telephone will perform mixes for each voice channel supported at that IP device.

In operation, FIGS. 7a-e show one embodiment of how a conference call is established and maintained. While it is within the scope of the invention that each IP telephone has sufficient bandwidth to support multiple communication channels, to simplify this discussion, it will be assumed that each IP telephone has sufficient bandwidth to support two voice channels (for audio signals) plus three signaling channels (for data signals).

Figure 7A:
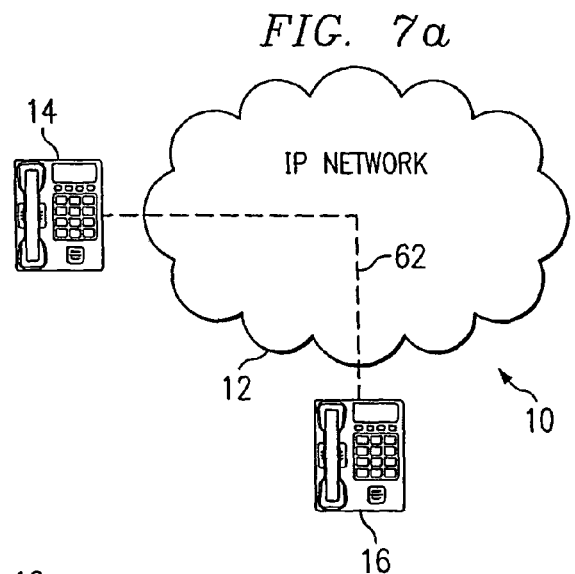
FIGS. 7a-e illustrate one embodiment of establishing an IP network conference call.

As illustrated in FIG. 7a, at a prearranged time, the conference sponsor (not shown) sets his IP telephone 14 in conference mode and waits for other conferees to establish communication channels using their IP telephones. At a later time, a calling party sets his IP telephone 16 in conference mode and sends a "conference request" signal to the sponsor's IP telephone 14. by inputting the telephone number, IP address, Universal Resource Locator (URL), or the like of the conference sponsor. The conference request signal is transmitted over a signaling channel established between the sponsor's and calling party's IP telephones 14, 16 (shown by dotted line 62).

The authorization module 50 of the IP telephone 14 determines whether the IP telephone 16 is a valid or pre-authorized participant to the conference call. For example, the conference sponsor previously entered into his IP telephone 14 a list of pre-authorized conferees or a predetermined conference password that a calling party must input, when prompted, to join the present conference call. The list of pre-authorized conferees may contain the identification code of each authorized conferee, and the IP telephone 16 can automatically transmit the identification code to the IP telephone 14.

If the IP telephone 14 verifies that the proper conference password or identification code was received, or if the conference request signal includes a call-reference, the IP telephone 14 authorizes the calling party's IP telephone 16 to join the conference call. Next, the IP telephone 14 determines whether it can support the calling party's IP telephone 16 for the conference call. Since the IP telephone 14 can support two voice channels and is not currently connected with another IP telephone, a voice communication channel is established between the IP telephones 14, 16 (shown by solid line 64 in FIG. 7b) whereby the sponsor and the calling party, now second conferee, can conduct an interactive voice conversation. The connected conferees will hear a sound or an announcement indicating the joining of each new conferee, here, IP telephone 16. The signaling channel 62 between the IP telephones 14, 16 remains connected.

Figure 7B:
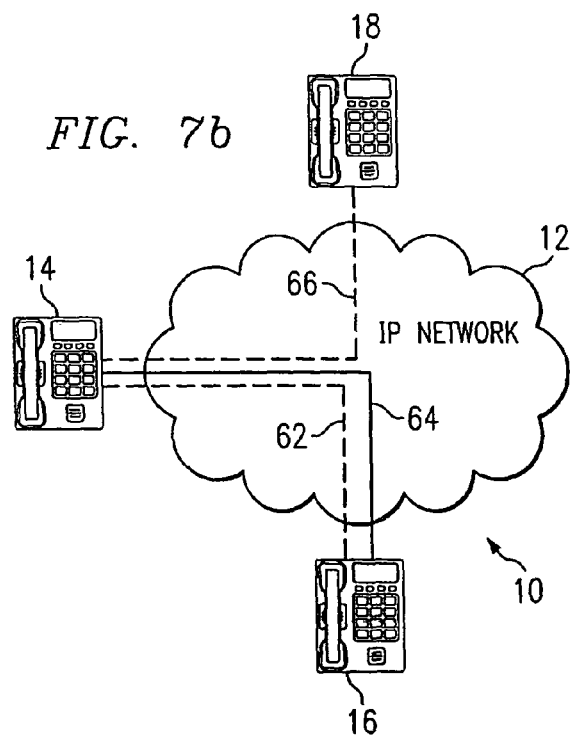

In FIG. 7b, a calling party sets his IP telephone 18 in conference mode and sends a conference request signal to the conference sponsor's IP telephone 14. The conference request signal is transmitted over a signaling channel established between the sponsor's and calling party's IP telephones 14, 18 (shown by dotted line 66). After verifying that the calling party is a valid conference call participant, the IP telephone 14 determines whether it can support the calling party's IP telephone 18 (i.e., support a voice channel between IP telephones 14, 18). Here, the IP telephone 14 is currently connected to one IP telephone 16 (shown by solid line 64), so a second voice channel is established between the IP telephones 14, 18 (shown by solid line 68 in FIG. 7c). In this configuration, the conference sponsor and second and third conferees can interactively conduct a voice conversation, whereby audio signals between the second and third conferees are mixed and pass through the IP telephone 14 of the sponsor.

Figure 7C:
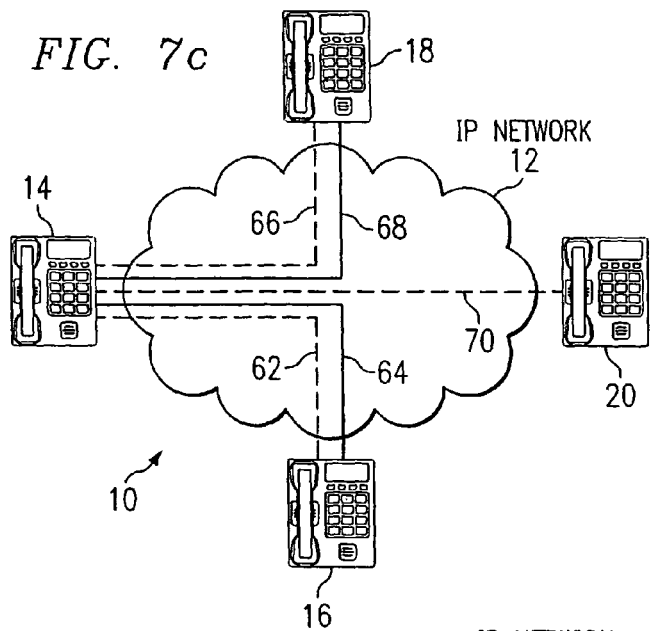

In FIG. 7c, a calling party sets his IP telephone 20 in conference mode and sends a conference request signal to the conference sponsor's IP telephone 14. The conference request signal is transmitted over a signaling channel established between the sponsor's and calling party's IP telephones 14, 20 (shown by dotted line 70). After verifying that the calling party is a valid conference call participant, the IP telephone 14 determines whether it can support a voice channel with the calling party's IP telephone 20. Here, the IP telephone 14 is supporting voice channels with two IP telephones 16, 18 (shown by solid lines 64, 68), and based on the assumption that each IP telephone can support only two voice channels, a third voice channel between the IP telephones 14, 20 is not established. Rather, the IP telephone 14 will call-forward the IP telephone 20 to one of the connected IP telephones 16, 18, based on the network conditions or on a call-transfer algorithm. Here it will be assumed that the IP telephone 14 will follow the algorithm of alternating the call-forwarding of calling parties between the connected IP telephones 16, 18. Accordingly, the IP telephone 14 call-forwards the IP telephone 20 to the IP telephone 16, which can support a second voice communication channel—a first voice communication channel 64 existing between the conference sponsor's IP telephone 14 and the second conferee's IP telephone 16. A voice channel is established between the IP telephones 16, 20 (shown by solid line 72 in FIG. 7*d*), and the signaling channel 70 between the IP telephones 14, 20 is terminated. A signaling channel 74 (shown in FIG. 7*d*) between the IP telephones 16, 20 is established. In this configuration, the four conferees can conduct a conference call. Further, the call-forward process is transparent, or completed with little interruption, to the conferees.

Figure 7D:
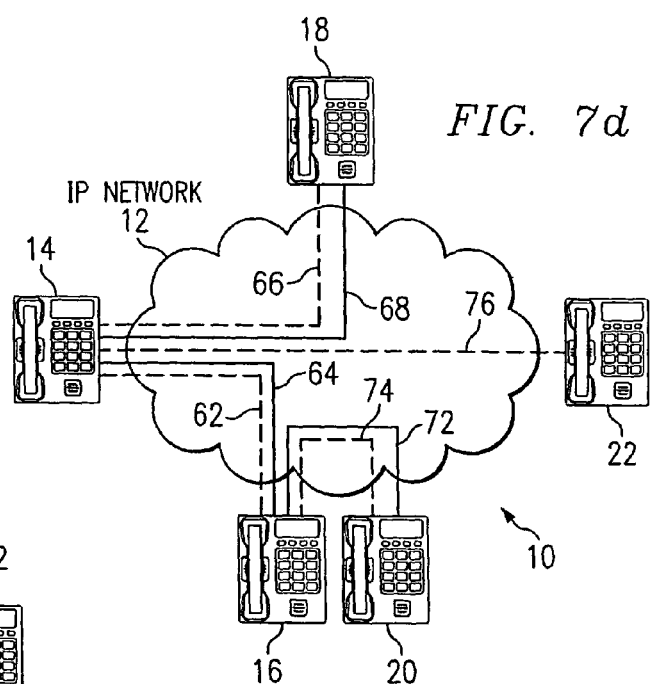

In FIG. 7*d*, a calling party sets his IP telephone 22 in conference mode and sends a conference request signal to the sponsor's IP telephone 14. The conference request signal is transmitted over a communication channel established between the sponsor's and calling party's IP telephones 14, 22 (shown by dotted line 76). After verifying that the calling party is a valid conference call participant, the IP telephone 14 determines whether it can support a voice channel with the calling party's IP telephone 22. Since the IP telephone 14 is supporting two voice channels with IP telephones 16, 18 (shown by solid lines 64, 68), a third voice channel between the IP telephones 14, 22 is not established. Rather, the IP telephone 14 will call forward the IP telephone 22 to the connected IP telephone 18, based on the call-forward algorithm, which can support a second voice communication channel—the first voice communication channel 68 existing between the sponsor's IP telephone 14 and the third conferee's IP telephone 18. Accordingly, a voice channel is established between the IP telephones 18, 22 (shown by solid line 78 in FIG. 7*e*), and the signaling channel 76 between the IP telephones 14, 22 is terminated. A new signaling channel 80 between the IP telephones 18, 22 is established. In this configuration, the five conference call participants can conduct an interactive voice conversation, whereby audio signals between the second and fifth conferees pass through the connected IP telephones 14, 18.

Figure 7E:
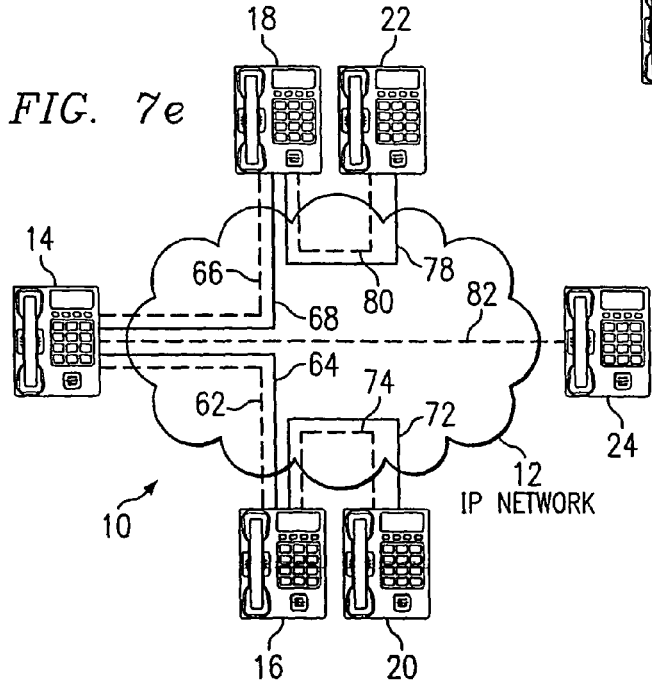

Similarly, in FIG. 7*e*, a calling party sets his IP telephone 24 in conference mode and sends a conference request signal to the conference sponsor's IP telephone 14. The conference request signal is transmitted over a communication channel established between the sponsor's and calling party's IP telephones 14, 24. (shown by dotted line 82) After verifying that the calling party is a valid conference call participant, the IP telephone 14 determines whether it can support the calling party's IP telephone 24. For reasons discussed above, a voice channel between the IP telephones 14, 24 is not established. Rather, the IP telephone 14 will call-forward the IP telephone 24 to the connected EP telephone 16, based on the call-forward, which also determines that it cannot support the calling party's IP telephone 24. Accordingly, the IP telephone 16 will call-forward the IP telephone 24 to the connected IP telephone 20 which can support a second voice channel. Consequently, a voice channel 84 (not shown) is established between the IP telephones 20, 24, and the signaling channel 82 between the IP telephones 14, 24 is terminated. In this configuration, the six conference call participants can conduct an interactive voice conversation. Moreover, it is within the scope of the invention that an unlimited number of conferees can be added to the conference call using the present method.

Figure 8:
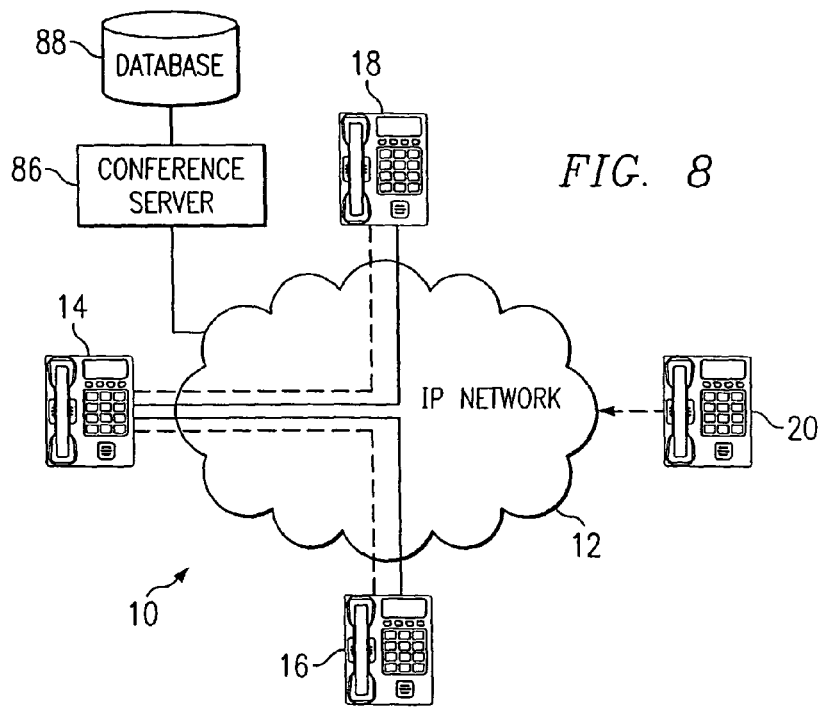
FIG. 8 illustrates an alternative embodiment of establishing an IP network conference

It should be noted that in this embodiment of establishing and maintaining an IP conference call, the IP telephone 14 performs the authorization steps and each affected IP telephone performs the analysis steps for call-forwarding the conference call. In an alternative embodiment, and as illustrated in FIG. 8, conference request signals from the IP telephones 14, 16, 18, 20, 22, 24 are sent to a conference server 86 which connects to an associated database 88. The database 88 contains the conference passwords, identification codes of authorized conferees, and/or proper call-references for determining whether to allow a calling party to join the IP conference call. In operation, after receiving the conference request signal, the conference server 86 issues a search command signal and causes a search of the database 88 to identify whether the calling party is an appropriate conferee. If so, the conference server 86 allows the authorized IP telephone access to the conference call and to establish a communication channel.

Figure 9A:
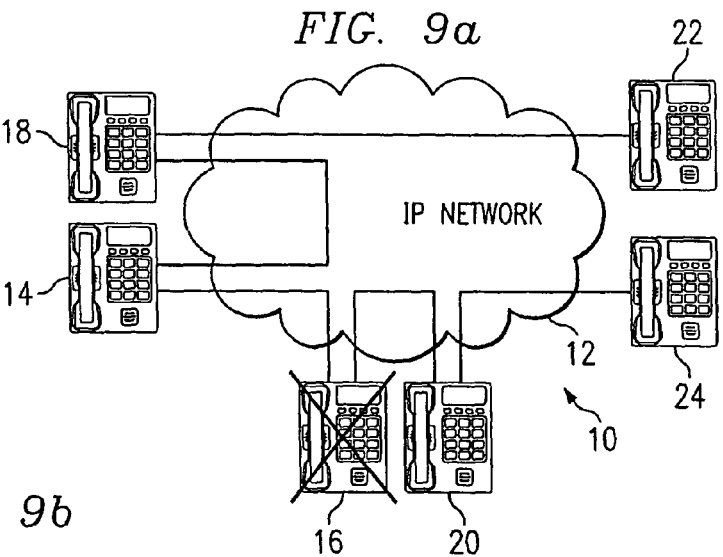
FIGS. 9a-b illustrate one embodiment of maintaining an IP network conference call when a conference call participant exits from the IP network conference call.
Figure 9B:
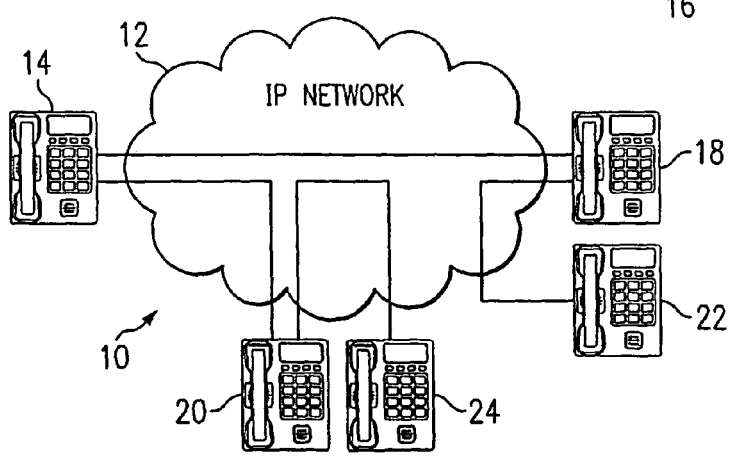

As shown in FIGS. 9*a-b*, after establishing a conference call, a conferee may wish to exit the conference call without disconnecting a supported IP telephone. For example, in FIG. 9*a*, the second conferee at IP telephone 16 wishes to exit the conference call without significantly interrupting the supported conferees' connection to the established conference call. Accordingly, the IP telephone 16 exits from conference mode and disconnects from the conference call. When exiting from conference mode, the IP telephone 16 detects whether it was supporting voice channels with two IP telephones 14, 18, for example, by searching the memory unit 36 of FIG. 5. If so, the IP telephone 16 call-transfers the supported IP telephone, here, IP telephone 20, to, for example, IP telephone 14, based on the call-reference. The voice channel between IP telephones 16, 20 would be terminated. Then, as illustrated in FIG. 9*b*, a voice channel is then established between the IP telephones 14, 20, and the remaining conferees can continue participating in the IP conference call. Alternatively, if IP telephone 24 was exiting from the conference call, it would not detect voice channels with two IP telephones. Thus, the voice channel between IP telephones 20, 24 would terminate without having to perform a call-transfer process.

The conference sponsor at IP telephone 14 can exit the IP conference call without significantly interrupting the conferees' participation in the established conference call. However after the IP telephone 14 exits, calling parties cannot join the conference call since their conference request signals will not be received and authorized by the IP telephone 14. In an alternative embodiment, the IP telephone 14 can transfer the conferencing and authorization responsibilities to an IP telephone of a remaining conferee.

FIG. 10 shows the steps of an exemplary embodiment of a conference negotiation scheme to establish a conference call over the IP network 12 between multiple IP telephones, as it relates to FIGS. 7*a-e*.

Initially, at a pre-arranged time, the conference sponsor uses the conferencing module 46 to set his IP telephone 14 in conference mode and waits to receive conference request signals from other calling parties. Similarly, a calling party uses the conferencing module 46 to set his IP telephone 16 in conference mode and sends a conference request signal to the IP telephone 14 over a signaling channel established between the IP devices 14, 16, as indicated at block 105.

At decision block 110, it is determined whether the calling party at IP telephone 16 is an authorized conferee. If not, the process flows to the block 115 where the authorization module 50 sends a signal to the IP device 16 indicating that the calling party will be denied access to the conference call.

Otherwise, at decision block 120, the IP telephone 14 determines whether it can support a voice channel with the IP telephone 16. If so, before the voice channel is established between the IP telephones 14, 16, the IP device 14 indicates or announces the joining of the new conferee. Then, as shown at block 125, a voice channel is established between the IP devices 14, 16, whereby the conferees can conduct a voice conversation over the IP network 12.

If the answer to decision block 120 is no, the conferencing module 46 sends a transfer command to the call-transfer/forward controller 52 of the calling party's IP telephone 16 over the signaling channel, as indicated at block 130. The transfer command includes a call-reference and a conference request command that designates another IP telephone connected to the conference call. The conferencing module 46 designates the particular IP telephone based on network condition information provided by the network monitoring module 54. Next at block 135, the call-transfer/forward controller 52 causes the IP telephone 16 to terminate the signaling channel between IP telephones 14, 16 and, as indicated at block 140, sends a conference request signal to the IP telephone designated in the conference request command.

Next, the flow loops back to decision block 120, where it is determined whether a voice channel can be established between the designated IP telephone and the calling party's IP telephone 16. If so, the voice channel can be established between the designated IP telephone and the calling party's IP telephone 16 without having to be re-authorized by the authorization module 50, based on the call-reference. Moreover, the call negotiation module 56 and the mixing module 58 operate in conjunction to enable the conferees to conduct their interactive conference call.

FIG. 11 shows the steps of an exemplary embodiment of a conference negotiation scheme when a conferee exits from an established conference call over the IP network 12, as it relates to FIGS. 9*a-b*.

At block 205, the conferee at IP telephone 16 uses the conferencing module 46 to exit from conference mode. Next at decision block 210, it is determined whether the IP telephone 16 was supporting another IP telephone, here, IP telephone 20.

If the answer to decision block 210 is no, for example, if IP telephone 24 was exiting from the conference call, then the voice channel is terminated, as shown at block 215, and the IP telephone 16 is ready to receive or establish another communication channel. Otherwise, having detected the supported voice channel, the conferencing module 46 determines which IP telephone to transfer the supported IP telephone 20. For example, such determination is based on the network condition information provided by the network monitoring module 54.

Next at block 220, the conferencing module 46 sends a signal to the call-transfer/forward controller 52 of the supported IP telephone 20, wherein the signal includes a call-reference and a conference request command that designates which IP telephone to transfer the supported IP telephone 20. At block 225, the call-transfer/forward controller 52 causes the IP telephone 16 to terminate the signaling channel between the IP telephones 16, 20 and send a conference request signal to the IP telephone designated in the conference request command, here, IP telephone 14. A voice channel is established between the IP telephones 14, 20 without having to re-authorized IP telephone 20, based on the call-reference. Moreover, the remaining conferees can continue their conference call.

The present invention concerns a system and method for support conferencing to capabilities over packet-switched networks. While the invention has been described in detail with reference to the preferred embodiments thereof, it will be apparent to one skilled in the art that various changes and modifications can be made and equivalents employed without departing from the present invention.

What is claimed is:

1. A first station for providing telecommunication service, comprising:
 a conferencing module operable to receive a first conference request signal and to receive a second conference request signal;
 a channel establishment module operable to:
  establish a first communication channel between the first station and a second station in response to the conferencing module receiving the first conference request signal, wherein the first communication channel is operable to support voice communication between the first station and the second station over a packet-switched network;
  establish a second communication channel between the first station and a third station in response to the conferencing module receiving the second conference request signal, wherein the second communication channel is operable to support voice communication between the first station and the third station over the packet-switched network;
 a mixing module operable to mix signals received from the second station with signals received from the third station;
 a playback module operable to play the mixed signals to a user as part of a conference call; and
 a monitoring module operable to detect a change in a network condition that affects a quality of service associated the conference call, and wherein the conferencing module is further operable to transmit a transfer signal to the second station in response to detecting the change in the network condition.

2. The first station of claim 1, further comprising a transfer module operable to receive a transfer signal from the third station and, in response to receiving the transfer signal, transfer the second communication channel to a fourth station by:
 disconnecting the third station from the conference call; and
 establishing a third communication channel between the first station and the fourth station.

3. The first station of claim 2, wherein the transfer signal comprises a signal identifying the fourth station.

4. The first station of claim 1, further comprising:
 an authorization module operable to authorize the channel establishment module to establish the first communication channel in response to the first station receiving, from the second station, a predetermined identification code associated with the conference call.

5. The first station of claim 4, wherein the identification code uniquely identifies the second station.

6. The first station of claim 4, wherein the authorization module is operable to authorize the channel establishment module to establish the first communication channel by authorizing the channel establishment module to establish the first communication channel in response to the first station receiving, from the second station, a data packet that includes the identification code and a header that identifies a station from which the data packet was received.

7. The first station of claim 4, wherein the authorization module is configured to prevent the establishment of a communication channel between the first station and the second station if the second station is not authorized to access the conference call.

8. The first station of claim 1, wherein the first conference request signal includes information identifying the second station.

9. The first station of claim 1, wherein the channel establishment module is further operable to transmit signals to the second station and the third station to indicate successful establishment of the first communication channel and the second communication channel.

10. A system for providing telecommunication service, comprising:

a network operable to support packet-switched communications between two or more of a plurality of stations; and the plurality of stations, each of the stations operable to provide communication service to a user associated with that station, wherein the plurality of stations includes a first station further operable to:

receive a first conference request signal;

establish a first communication channel between the first station and a second station in response to receiving the first conference request signal, wherein the first communication channel is operable to support voice communication between the first station and the second station over the network;

receive a second conference request signal;

establish a second communication channel between the first station and a third station in response to receiving the second conference request signal, wherein the second communication channel is operable to support voice communication between the first station and the third station over the network;

mix signals received from the second station with signals received from the third station;

play the mixed signals to a user associated with the first station as part of a conference call;

detect a change in a network condition that affects a quality of service associated with the conference call; and in response to detecting the change in the network condition, transmit a transfer signal to the second station.

11. The system of claim 10, wherein the first station is further operable to receive a transfer signal from the third station and, in response to receiving the transfer signal, transfer the second communication channel to a fourth station by:

disconnecting the third station from the conference call; and establishing a third communication channel between the first station and the fourth station.

12. The system of claim 11, wherein the transfer signal comprises a signal identifying the fourth station.

13. The system of claim 10, wherein the first station is further operable to determine whether to establish the first communication channel based on whether the first station receives, from the second station, a predetermined identification code associated with the conference call.

14. The system of claim 13, wherein the identification code uniquely identifies the second station.

15. The system of claim 13, wherein the first station is operable to determine whether to establish the first communication channel by determining whether the first station receives, from the second station, a data packet that includes the identification code and a header that identifies a station from which the data packet was received.

16. The system of claim 13, wherein the first station is configured to prevent the establishment of a communication channel between the first station and the second station if the second station is not authorized to access the conference call.

17. The system of claim 10, wherein the first conference request signal includes information identifying the second station.

18. The system of claim 10, wherein the first station is further operable to transmit signals to the second station and the third station to indicate successful establishment of the first communication channel and the second communication channel.

19. A method for providing telecommunication service, comprising:

receiving, at a first station, a first conference request signal and a second conference request signal;

in response to receiving the first conference request signal, establishing a first communication channel between the first station and a second station, wherein the first communication channel is operable to support voice communication between the first station and the second station over a packet-switched network;

in response to receiving the second conference request signal, establishing a second communication channel between the first station and a third station, wherein the second communication channel is operable to support voice communication between the first station and the third station over the packet-switched network;

mixing, at the first station, signals received from the second station with signals received from the third station;

playing, with the first station, the mixed signals to a user as part of a conference call;

monitoring a network condition that affects a quality of service associated with the conference call; and transmitting a transfer signal from the first station to the second station in response to detecting a change in the network condition.

20. The method of claim 19, further comprising receiving, at the first station, a transfer signal from the third station and, in response to receiving the transfer signal, transferring the second communication channel to a fourth station by:

disconnecting the third station from the conference call; and establishing a third communication channel between the first station and the fourth station.

21. The method of claim 20, wherein the transfer signal comprises a signal identifying the fourth station.

22. The method of claim 19, further comprising authorizing the second station for access to the conference call based on whether the first station receives from the second station a predetermined identification code associated with the conference call.

23. The method of claim 22, wherein the identification code uniquely identifies the second station.

24. The method of claim 22, wherein authorizing the second station to access the conference call comprises determining whether the first station receives, from the second station, a data packet that includes the identification code and a header that identifies a station from which the data packet was received.

25. The method of claim 22, further comprising preventing the establishment of a communication channel between the first station and the second station if the second station is not authorized to access the conference call.

26. The method of claim 19, wherein the first conference request signal includes information identifying the second station.

27. The method of claim 19, further comprising transmitting signals from the first station to the second station and the third station to indicate successful establishment of the first communication channel and the second communication channel.

28. A system for providing telecommunication service, comprising:

means for receiving, at a first station, a first conference request signal and a second conference request signal;

means for establishing a first communication channel between the first station and a second station in response to the means for receiving the first conference request signal, wherein the first communication channel is operable to support voice communication between the first station and the second station over the network;

means for establishing a second communication channel between the first station and a third station in response to the means for receiving the second conference request signal, wherein the second communication channel is operable to support voice communication between the first station and the third station over the network;

means for mixing, at the first station, signals received from the second station with signals received from the third station;

means for playing, at the first station, the mixed signals to a user associated with the first station as part of a conference call;

means for detecting a change in a network condition that affects a quality of service associated with the conference call; and means for transmitting a transfer signal from the first station to the second station in response to detecting the change in the network condition.

* * * * *